United States Patent [19]

Whittley

[11] Patent Number: 5,646,952

[45] Date of Patent: Jul. 8, 1997

[54] LASER

[75] Inventor: Stewart Trevor Whittley, South Queensland, Great Britain

[73] Assignee: GEC-Marconi Avionics (Holdings) Limited, Stanmore, England

[21] Appl. No.: 513,921

[22] PCT Filed: Mar. 18, 1994

[86] PCT No.: PCT/GB94/00554

§ 371 Date: Dec. 1, 1995

§ 102(e) Date: Dec. 1, 1995

[87] PCT Pub. No.: WO94/22189

PCT Pub. Date: Sep. 29, 1994

[30] Foreign Application Priority Data

Mar. 20, 1993 [GB] United Kingdom ............ 9305854

[51] Int. Cl.⁶ ............................ H01S 3/13
[52] U.S. Cl. ..................... 372/32; 372/18; 372/19
[58] Field of Search .................... 372/18, 19, 25, 372/32

[56] References Cited

U.S. PATENT DOCUMENTS 4,197,513  4/1980  Bell et al. .
5,412,676  5/1995  Schnier et al. ............ 372/18

FOREIGN PATENT DOCUMENTS 0108562   5/1984  European Pat. Off. .
0 108 562 5/1984  European Pat. Off. .
0 109 254 5/1984  European Pat. Off. .
2 257 294 1/1993  United Kingdom .

OTHER PUBLICATIONS

Rae et al; "Single Frequency, End Pumped Nd:YLF Laser Excited By a 12-MJ Diode Laser Array"; *Optics Letters*; Dec. 1992; pp. 1673–1675.

D.C. Hanna et al; "Stable Single-Mode Operation Of a Q-Switched Laser By a Simple Resonator Length Control Technique" Optics Communications, vol. 43, No. 6, pp. 414–418, Nov. 15, 1982.

C.F. Rae et al; "Single-Frequency, End-Pumped nd:YLF Laser Excited By a 12-mj Diode-Laser Array" Optics Letters, vol. 17, No. 23, pp. 1673–1675, Dec. 1, 1992.

Patent Abstracts of Japan, vol. 11, No. 338 (E–553) Nov. 5, 1987 & JP A62119991 (NEC Corp) Jun. 1, 1987.

*Primary Examiner*—Rodney B. Bovernick
*Assistant Examiner*—Robert E. Wise
*Attorney, Agent, or Firm*—Spencer & Frank

[57] ABSTRACT

A pulsed laser comprises a laser rod (6), and is pumped by diode array (3) selected such that with additional components (7, 9) only a maximum of two longitudinal modes are generated between mirror (1) and output coupler (2). By slow Q-switching Q-switch (9) hoped to get a single longitudinal mode output pulse. However if on the onset of the relaxation pulse mode beating is detected by detector (28), indicating that two longitudinal modes are present, then the optical path length of the resonator is changed by quarter of one wave length, by applying an electrical signal to a pulse length control means (10), such that one of the modes is suppressed prior to the Q-switch being fully opened. The output may be amplified by amplifier arrangement (24).

20 Claims, 2 Drawing Sheets

LASER

BACKGROUND OF THE INVENTION

This invention relates to a laser for providing a single longitudinal mode (SLM) output.

A laser resonator can sustain waves which have any integral number of half wavelengths. These discrete frequencies of oscillation are known as modes of the resonator. In principle all mode frequencies which lie within the gain bandwidth of the laser medium can oscillate. Usually lasers run on many modes simultaneously, they are multi-transverse and multi-longitudinal modes. Each mode starts from noise (spontaneous emission), a random thermal like process. Initially the mode intensities grow exponentially with time and each mode competes with its neighbours for the available gain. This fierce competition leads to the suppression of weak modes, those that see low net gain or which started with low intensity. The modes nearest the gain centre see the highest gain and reach the saturating intensity first. This line narrowing process can be enhanced by lengthening the build-up time of the oscillation in order to allow more time for mode competition. Etalons and other interferometric techniques are also used to introduce additional losses on unwanted modes. However getting a high gain solid state laser, such as Neodymium: YAG or YLF, to run SLM is still difficult and it has previously been found necessary to ensure the oscillator also runs in a single transverse mode.

The present inventors have established that a diode pumped end pumped Neodymium master oscillator will run TEMoo and SLM. This is discussed in the paper: Single Frequency, end pumped Nd:YLF laser excited by a 12 mJ diode-laser array: Optical Letters; Dec. 1, 1992, Vol. 17, No. 23, the contents of which are hereby incorporated by way of reference. The SLM performance is achieved by slow Q-switching and cavity length control and by pumping the oscillator at low level (1 mJ output). The single mode which oscillates is generally that which is closest to the centre of the gain bandwidth (line centre). However this mode has been found to be unstable as the environment changes, and the mode frequency drifts away from line centre until two longitudinal modes occur.

An extension to the technique of "pre-lase" Q-switching which ensures that a TEMoo mode, Q-switched NdYAG laser produces SLM oscillation on every shot is disclosed in Optics Communications, 43 (1982) 6, pages 414–418. This discloses monitoring the pre-lase output and only opening the Q-switch when SLM oscillation is detected, relying on the heat generated in the lasing medium in conjunction with the coefficient of expansion of the lasing medium to perform a resonator length sweep with a sufficient shift in path length to ensure that SLM oscillation is present at some point during the sweep, normally within the period in which four or five pre-lase pulses occur. The document also discloses including an actuator to physically alter the path length of the resonator if the coefficient of expansion of the laser medium is not sufficient.

SUMMARY OF THE INVENTION

It is an object of the present invention is to provide an improved laser the output of which comprises a single longitudinal mode.

According to the present invention there is provided a laser comprising: a laser medium; a resonator; a Q-switch for controlling the level of oscillation within the resonator; Q-switch control means; means for applying a pump beam to the resonator in an end pumped geometry such that the laser operates in either a single longitudinal mode or in two neighbouring longitudinal modes; and means for detecting the presence of two longitudinal modes; characterised in further comprising path length control means responsive to the detection of the presence of two longitudinal modes for controlling means for varying the optical path length of the resonator by a discrete length substantially equal to an odd integral multiple of one quarter of the wavelength at which the laser is operating.

The inventors have realised that the instability of the SLM is due to small changes in the optical path length of the resonator. These occur due to physical expansion of the chamber and also due to the change in the refractive index of the optical constituents within the laser, both of which occur because of temperature changes. However the inventors have observed that the laser can be arranged to run such that no more than two longitudinal modes are present, and that these are adjacent modes. Therefore by employing the present invention it is possible, in response to detecting the onset of more than an SLM, to simply vary, or switch, the path length of the resonator by a discrete value in order to return the laser to an SLM. This thereby maintains an SLM without either having to determine the mode or modes initially present, accurately maintain the path length of the resonator, or monitor the response of the laser to the variation made to the path length. The resultant SLM may not be known, but for many applications the exact frequency of the SLM is not important, so long as there is only one SLM present in the output. This is particularly advantageous where the laser is a pulsed laser.

When two modes are present they are adjacent modes and nearest neighbour mode beating occurs. Advantageously the presence of two modes is detected by detecting this mode beating.

Mode beating will only occur when the resonator optical path length has changed sufficiently for two adjacent longitudinal modes to be nearly symmetrically placed about the line centre, otherwise the dominant mode prevails to the detriment of the other. Therefore by varying the optical path length of the resonator by substantially an odd integral multiple of one quarter of the wavelength at which the laser is operating, (i.e. $\frac{1}{4}\lambda$, $\frac{3}{4}\lambda$, $\frac{5}{4}\lambda$, ... ), one of the modes will move back close to line centre. It will be appreciated that it is irrelevant whether the path length is shortened or extended for in either case one of the modes will be brought onto the line centre such that only an SLM is present. Therefore the means for varying the path length need only have two states.

The means for varying the optical path length can conveniently comprise a piezo electric transducer driving a mirror defining the resonator. However, piezo electric transducers are relatively slow and it has been found preferable to have means for varying the optical path length comprising an element in the optical path, the refractive index of the element being altered by the application of a voltage. This voltage can have one of two values, one of which may be zero, which causes the path length through the block of material to alter by a quarter of one wavelength. The switch thus only has two states.

Preferably a laser in accordance with the invention further comprises control means arranged to control the laser such that in use: the Q-switch control means partially opens the Q-switch, (which partial opening can be a progressive action), in response to the application of a pump pulse to the resonator, until a relaxation pulse appears; and means monitoring for the presence of two longitudinal modes; if only a single longitudinal mode is detected (by the absence of beats) the Q-switch control means causes the Q-switch to be opened further; and if two longitudinal modes are detected (presence of beats) the path length control means causes the means for varying the optical path length to alter the optical path length.

By partially opening the Q-switch of the cavity during the pump pulse, low level oscillation builds up over the pump duration, resulting in a low intensity relaxation pulse. If the resonator length is correct, mode competition during the many round trips results in the selection of an SLM, which is detected by the absence of any mode beating on the relaxation pulse. The Q-switch is then fully opened, resulting in an SLM giant pulse. If however mode beating is detected, due to changes in the resonator length having caused the mode frequency to drift away from line centre, then instead of opening the Q-switch fully the path length is changed, preferably by a quarter of one wavelength. The next relaxation pulse, which typically follows the first by about 10 μs, will then comprise an SLM and can be fully Q-switched.

It is advantageous wherein if two longitudinal modes are present the path length is changed between successive relaxation pulses such that the next output pulse from the laser comprises an SLM.

Preferably the laser is end pumped by a laser diode. This can be arranged to limit the laser's oscillation to single transverse mode and either one or two longitudinal modes at any one time.

Another advantage of the present invention is that the beat frequency to be monitored is that of the nearest neighbour modes only, which in a typical application would be in the range of 500 to 800 MHz, which is a relatively easy range to monitor.

A preferred lasing medium is Neodymium doped Yttrium lithium fluoride (Nd:YLF).

BRIEF DESCRIPTION OF THE DRAWINGS

One embodiment of the present invention will now be described by way of example only with reference to the accompanying drawings, of which:

Referring to FIGS. 1A and 1B, the resonant cavity of the laser is defined by mirror 1 and concave coupler 2. Light from diode array 3 is focused by cylindrical lens 4 and aspheric lens 5 onto a laser medium which comprises a Nd:YLF rod 6 within the resonator cavity. Light within the cavity resonates through an anamorphic prism pair 7 and polariser 8, Q-switch 9 and electro-optic path length controller 10. A practical implementation of the components illustrated in FIGS. 1A and 1B is illustrated in FIG. 2, in which like components to those in FIGS. 1A and 1B have the same reference numerals.

Referring to FIG. 2, the components are seen mounted on a flat aluminium chassis 20, the approximate dimensions of which are 350 mm×150 mm×25 mm. In addition to the components referred to above with reference to FIGS. 1A and 1B, there are additionally mounted on the chassis a polariser 21, a folding prism 22, a wave plate 23, amplifier 24 and a Porro prism 25, and under the chassis, (all of which are shown detached from the chassis for clarity), electro-optic length control electronics 26, a Q-switch modulator 27 and a mode beat monitor 28.

Figure 1A:
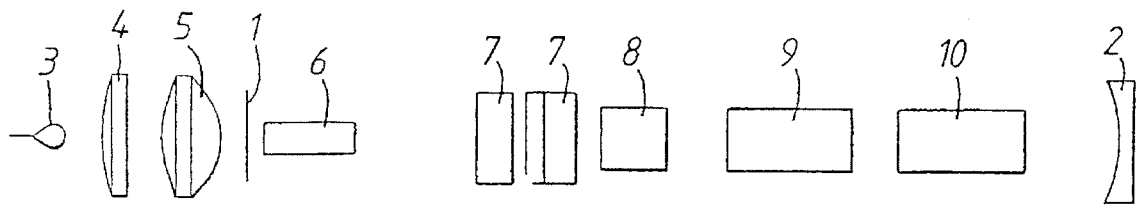
FIG. 1A is a schematic side elevation of the components of a laser in accordance with the present invention.
Figure 1B:
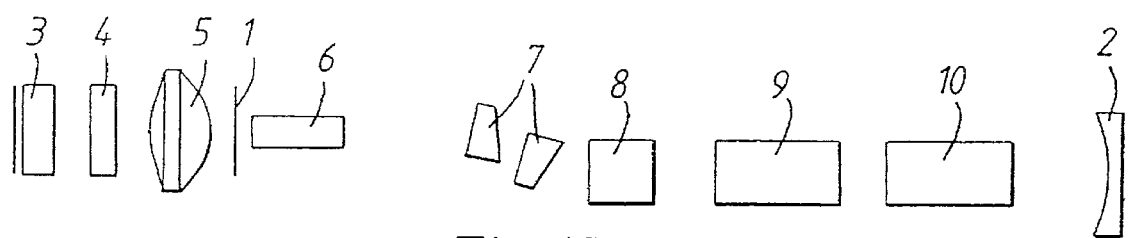
FIG. 1B is a plan view of the components of FIG. 1A.
Figure 2:
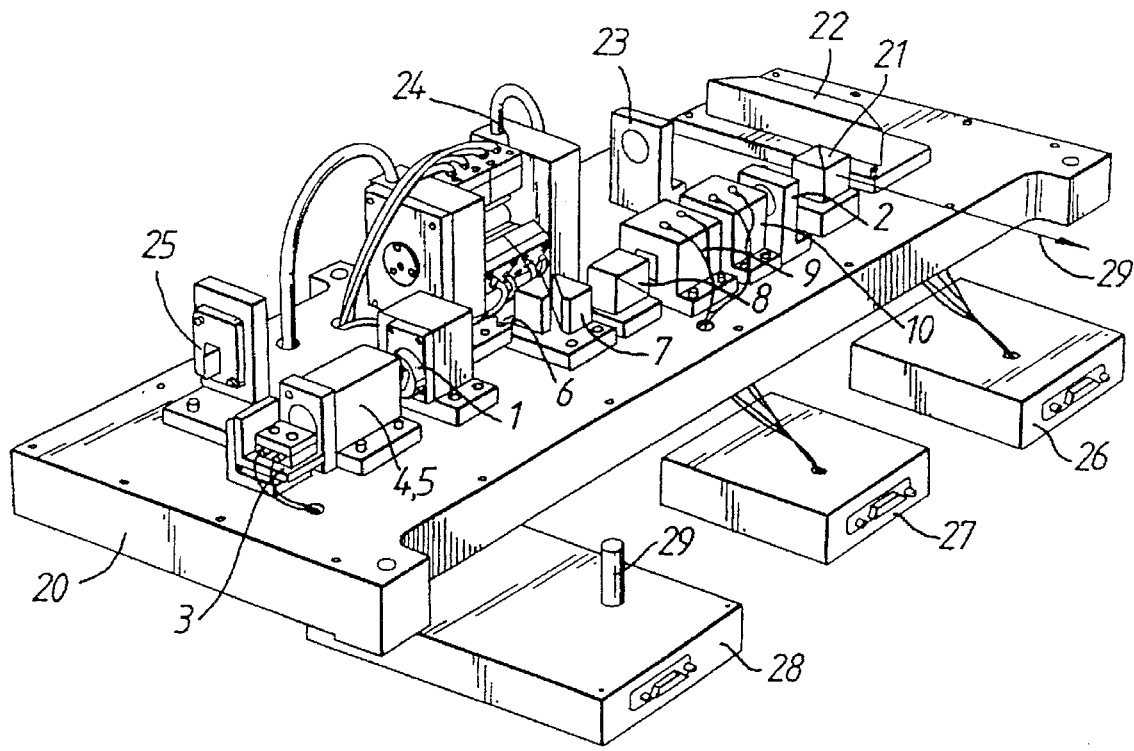
FIG. 2 is a perspective view of a laser in accordance with the present invention incorporating the components illustrated in FIGS. 1A and 1B.

The mode beat monitor 28 has attached to its upper surface a metal conduit 29 which screens an optical path between a detector element located in the mode beat detector 28 and a pick-off in the optical path (not shown).

In operation a pump source is provided by diode array 3 for the Nd:YLF oscillator. The radiation from the diode is temperature tuned to the strong 797 nm absorption line of the Nd:YLF rod, and is used in an end pumped configuration. The Nd:YLF rod is longitudinally pumped by a diode laser array which is mode matched by means of the diode coupling and inter-cavity mode shaping optics 4, 5.

The Nd:YLF rod is 1% doped with Neodymium and the wavelength of operation is 1.053 um. The mirror 1 is anti-reflective at 800 nm and highly reflective at 1053 nm, permitting the pump beam to pass to the rod 6. The rod 6 is orientated such that its A axis is collinear with the resonator axis, reducing thermally induced birefringence to a negligible amount and allowing pumping along the higher absorption C axis.

The resonator cavity formed by mirror 1 and concave output coupler 2 is approximately 20 cm long and contains polariser 8 which is dielectrically coated and airspaced providing polarisation and wavelength selection for the resonator. The polariser 8 also provides the necessary contrast with the electro-optic lithium niobate (LiNbO3) crystal Q-switch 9.

The resonator operates in an elliptical TEMoo mode, and the curvature of the concave output coupler is selected to ensure only the lowest order resonator mode in the vertical plane has sufficient gain to lase, while this mode is expanded in the horizontal plane so as to fill the pumped volume. Magnification is accomplished using anamorphic prism pair 7 which magnifies the resonator mode in the horizontal plane by a factor of three.

In operation the Q-switch modulator 27 applies a voltage to the Q-switch 9 during the pump pulse to the diode 3, such that the Q-switch is opened slightly allowing low level oscillation to take place over the pump duration, the pre-lase phase. Under the right, conditions mode competition during the many round trips results in the selection of a single axial, or longitudinal, mode. The existence of this single mode is detected by the absence of any mode beating sensed by mode beat monitor 28 on the ensuing relaxation pulse. If no mode beating is present the Q-switch is fully opened by Q-switch modulator 27 and a single mode giant pulse is output through the concave output coupler 2.

If the optical path length within the resonator varies, then the mode frequency drifts away from the line centre. This is not a problem until two adjacent longitudinal modes are nearly symmetrically placed about the line centre, at which point strong mode beating is observed. If this occurs, then when the Q-switch is slightly opened, the mode beat monitor detect the mode beating at the onset of the relaxation pulse. The electro-optical path length control electronics 26 then alters the voltage applied to the electro-optic path length control 10 by the amount required to give a change in the path length through the lithium niobate of one quarter of a wavelength. The path length change required is of the order of 0.25 micron.

This change in wavelength puts one of the adjacent modes back close to line centre. This change of path length is accomplished between oscillations in the train of relaxation pulses such that SLM operation normally occurs within two relaxation oscillations such that the first allowed giant pulse of the laser is normally SLM.

To increase the output power from the concave output coupler 2, the output is passed through polariser 21, folding prism 22, and wave plate 23 such that it makes a double pass through the amplifier cavity 24 via Porro prism 25 before being output at 29.

Figure 3:
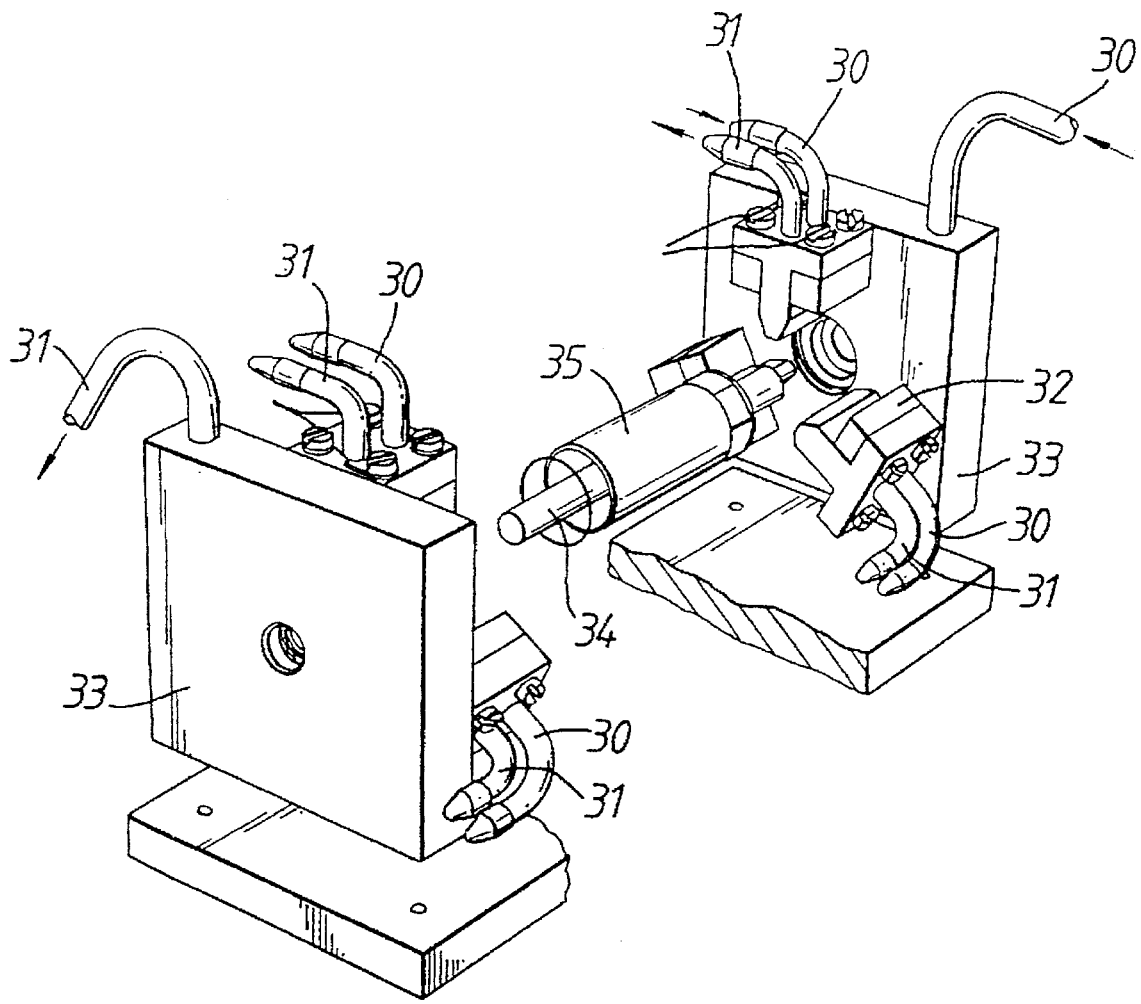
FIG. 3 is a perspective view of the amplifier 24 of FIG. 2.

The amplifier cavity 24 is illustrated in more detail in FIG. 3 and comprises coolant input pipes 30 and coolant output pipes 31 for cooling the diode arrays 32 and end plates 33. In the middle of the six diode arrays 32 is located the amplifier cavity which consists of a Nd:YLF rod 34 which is located within the six diode array stacks 32 and glass flow tube 35. Coolant passes in one end plate 33 along the flow tube 35 and out the other end plate 33.

Suitable components for the amplifier are: for the diode arrays 32, Spectra Diode Laboratories type SDL3230ZL diode laser array; and for the laser rod a 1% at. Wt. Nd doped YLF lasing medium.

It will be realised that the apparatus illustrated in the attached figures will require conventional support equipment, which for clarity has not been illustrated. This support equipment includes diode array drivers, a liquid cooling unit for the amplifier and a Peltier controller for Peltier coolers (not shown), which are attached to the body of diode arrays 3, 32 and the control circuit for the cavity length adjustment. A DC power supply unit will also be required to generate the DC supply used for the mode beat detector, Q-switch modulator and electro-optic length control module and also for providing low voltage supplies to the control units.

The attached figures illustrate one embodiment of the invention only. It will be readily appreciated that alternative geometries, including ring lasing geometries can be constructed in accordance with the present invention.

I claim:

1. A laser comprising:
    a laser medium;
    a resonator;
    a Q-switch for controlling the level of oscillation within the resonator;
    Q-switch control means;
    means for applying a pump beam to the resonator in an end pumped geometry such that the laser operates in either a single longitudinal mode or in two neighboring longitudinal modes; and
    means for detecting the presence of two longitudinal modes characterized in further comprising path length control means responsive to the detection of the presence of two longitudinal modes for controlling means for varying the optical path length of the resonator by a discrete length substantially equal to an odd integral multiple of one quarter of the wavelength at which the laser is operating.

2. A laser as claimed in claim 1 wherein the presence of two longitudinal modes is detected by means for detecting mode beating.

3. A laser as claimed in claim 2 wherein the means for varying the optical path length comprises an element in the optical path, the refractive index of the element being altered by application of a voltage.

4. A laser as claimed in claim 2 wherein the means for varying the optical path length comprises a piezo-electric transducer which drives a mirror of the resonator.

5. A laser as claimed in claim 1 wherein the means for varying the optical path length comprises an element in the optical path, the refractive index of the element being altered by application of a voltage.

6. A laser as claimed in claim 1 wherein the means for varying the optical path length comprises a piezo-electric transducer which drives a mirror of the resonator.

7. A laser as claimed in claim 1 wherein the path length control means applies a voltage having one of two values to the means for varying the optical path length.

8. A laser as claimed in claim 1 comprising control means arranged to control the laser such that in use: the Q-switch control means partially opens the Q-switch, in response to the application of a pump pulse to the resonator, until a relaxation pulse appears; means monitors for the presence of two longitudinal modes; if only a single longitudinal mode is detected the Q-switch control means causes the Q-switch to be opened further; and if two longitudinal modes are detected the path length control means causes the means for varying the optical path length to alter the optical path length.

9. A laser as claimed in claim 1 wherein if two longitudinal modes are present the path length is changed between successive relaxation pulses such that the next output pulse from the laser comprises a single longitudinal mode.

10. A laser as claimed in claim 1 which is pumped by a laser diode.

11. A laser as claimed in claim 1 in which the laser medium is Neodymium doped Yttrium Lithium Fluoride (Nd:YLF).

12. A laser comprising:
    a resonator containing a laser medium;
    a Q-switch disposed in the resonator for controlling a level of oscillation within the resonator;
    Q-switch control means operatively coupled to the Q-switch;
    means for applying a pump beam to the resonator in an end pumped geometry so that the laser operates in either a single longitudinal mode or in neighboring longitudinal modes;
    means coupled to the resonator for detecting a presence of two longitudinal modes;
    means for varying an optical path length of the resonator; and
    path length control mean coupled to the means for varying and responsive to the detection of the presence of two longitudinal modes for controlling the means for varying the optical path length of the resonator by a discrete length substantially equal to an odd integral multiple of one quarter of a wavelength at which the laser operates.

13. The laser according to claim 12, wherein the detecting means comprises means for detecting mode beating.

14. The laser according to claim 12, wherein the means for varying the optical path length comprises an element disposed in the optical path and having a refractive index that is alterable by application of a voltage.

15. The laser according to claim 12, wherein the resonator includes a mirror and the means for varying the optical path length comprises a piezo-electric transducer which drives the mirror.

16. The laser according to claim 12, wherein the path length control means applies a voltage having one of two values to the means for varying the optical path length.

17. The laser according to claim 12, further comprising a control circuit arranged to control the laser so that in use the Q-switch control means partially opens the Q-switch in response to an application of a pump pulse to the resonator until a relaxation pulse appears, and is responsive to the detecting means so that if only a single longitudinal mode is detected the Q-switch control means is caused to further open the Q-switch, and if two longitudinal modes are detected the path length control means is activated to cause the means for varying the optical path length to alter the optical path length.

18. The laser according to claim 17, wherein the control circuit is responsive to the detection means such that if two longitudinal modes are present the path length control means is activated to cause the means for varying the optical path length to change the path length between successive relaxation pulses so that a next output pulse from the laser comprises a single longitudinal mode.

19. The laser according to claim 12, wherein the applying means includes a laser diode.

20. The laser according to claim 12, wherein the laser medium comprises Neodymium doped Yttrium Lithium Fluoride (Nd:YLF).

* * * * *